United States Patent

Ottmann et al.

[15] 3,656,998

[45] Apr. 18, 1972

[54] PACKAGING FOIL AND PROCESS FOR PRODUCING SAME

[72] Inventors: Gerhard Ottmann; Clemens Lilienbeck, both of Wuppertal-Barmen, Germany

[73] Assignee: Dr. Kurt Herberts & Co., Vorm. Otto Louis Herberts, Berman, Germany

[22] Filed: Feb. 25, 1970

[21] Appl. No.: 14,237

[30] Foreign Application Priority Data

Feb. 26, 1969 Sweden....................................2607/69

[52] U.S. Cl. ..........................117/75, 99/171 LP, 117/76 F, 117/76 P, 117/138.8 E, 117/138.8 F, 117/138.8 N, 117/138.8 UA, 117/145, 161/190, 161/227, 161/231, 260/77.5 AN
[51] Int. Cl. .......................................B32b 27/08, B44d 1/14
[58] Field of Search.....................117/76 P, 76 F, 75, DIG. 7; 161/189, 190, 184, 227, 231, 252

[56] References Cited

UNITED STATES PATENTS

| | | | |
|---|---|---|---|
| 2,891,876 | 1/1959 | Brown et al............................ | 117/75 X |
| 3,035,939 | 5/1962 | Edwards................................. | 117/75 |
| 3,178,394 | 4/1965 | Christenson.......................... | 161/190 X |
| 3,198,692 | 8/1965 | Bridgeford........................... | 117/76 F X |
| 3,257,261 | 6/1966 | Hochberg............................ | 161/190 X |
| 3,514,367 | 5/1970 | James................................. | 117/76 F X |

*Primary Examiner*—William D. Martin
*Assistant Examiner*—Ralph Husack
*Attorney*—Oberlin, Maky, Donnelly & Renner

[57] ABSTRACT

Packaging foil comprising a flexible support foil, a top layer of a vinyl polymer, and an adhesion promoter or primer between the support foil and top layer, wherein the primer is a mixture of a chlorine or fluorine containing polymer, an organic compound of at least two isocyanate groups, and a reaction product having terminal hydroxyl groups and derived from a linear polyester with terminal hydroxyl groups and an organic diisocyanate.

18 Claims, No Drawings

PACKAGING FOIL AND PROCESS FOR PRODUCING SAME

The present invention relates to a packaging or wrapping foil comprising a flexible support foil, a top layer of a vinyl polymer and an adhesion promoter between the support foil and top layer, and constitutes an improvement over our prior, pending U.S. application, Ser. No. 765,040, filed Oct. 4, 1968.

Packaging foils are known which consist of a support foil and a top layer. According to the prior art, it is mainly foils of polyester, cellular glass or polypropylene which have so far been used as support foils. However, because these foils have an undesirable steam and gas permeability, they are consequently provided with a coating which has a polyvinylidene chloride (PVDC) or polyvinyl chloride (PVC) base. The PVDC or PVC coatings are produced by applying a dispersion or solution of PVDC or PVC to the support foils and evaporating the solvent or dispersion agent. However, the PVDC and PVC coatings produced in this way have an insufficient bonding with the support foils which are based on synthetic plastics materials. Consequently, it has been proposed to use so-called adhesion promoters. Solutions or dispersions of these adhesion promoters are applied to the support foil and the solvent contained therein is evaporated. Thereafter, the top layer, based on PVDC or PVC, is applied in the manner described above. Known adhesion promoters (primers) include solutions or dispersions which are based on polymeric alkylene imines (see German Auslegeschrift No. 1204559), polyamides, acrylates, isocyanates in combination with polyesters and/or polyethers, and epoxy compounds in combination with amines and polyamines.

These known packaging or wrapping foils have the disadvantage that there is an insufficient adhesion between the top layer and support foil. This becomes particularly apparent when these foils are kept for a relatively long time under conditions similar to tropical conditions. The insufficient adhesion results in the foils losing the desirable impermeability to steam and gas and being liable to be easily damaged. Since foils are widely used for packaging, for example, foods, for long periods, any damage to the foils in the manner indicated above leads to the wrapped products being unsuitable for practical use.

Our earlier application referred to above relates to a packaging foil comprising one or more flexible support foils, a top layer of a vinyl or vinylidene polymer and an adhesion promoter or primer between the supporting foil and the top layer wherein the primer is a mixture of a. a polymer of a compound of the general formula

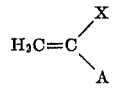

wherein X represents chlorine or fluorine and A represents hydrogen or has the same meaning as X, and b. a compound selected from the group consisting of an isocyanate of the formula:

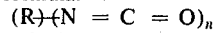

wherein R represents hydrocarbyl having from one to 18 carbon atoms; cyclohydrocarbyl having from five to 12 carbon atoms; single, multiple and fused ring aryl radicals having from six to 20 carbon atoms; Y — Z — Y wherein Z represents hydrocarbyl having from one to three carbon atoms and Y represents single, multiple and fused aryl and cyclohydrocarbyl radicals having from five to 20 carbon stoms; and n is an integer of at least 2 which corresponds to the valence of R; and a polyurethane of the formula:

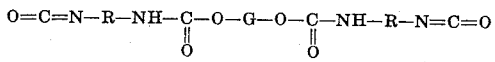

wherein R is as above and G is a long chain polymeric radical free from substituents reactive with an isocyanate and having a molecular weight above 480.

Although the adhesion promoter disclosed in our prior application greatly improves adhesion, it has now been found that, in accordance with the present invention, an even stronger adhesion — promoting effect can be obtained when the primer is a mixture containing an additional component (c) which is a reaction product having terminal hydroxyl groups and derived from a linear polyester with terminal hydroxyl groups and an organic diisocyanate. Reaction products of this kind are commercially available. They are marketed, for example, by Farbenfabriken Bayer AG., of Leverkusen, Germany, under the Registered Trade Mark Desmocol.

The aforesaid polyester component is a reaction product of dicarboxylic acids with diols. The dicarboxylic acid component preferably comprises an aliphatic dicarboxylic acid with up to 10, and especially with from four to six, carbon atoms, for example, adipic acid. The diol component preferably comprises an aliphatic diol with from two to six carbon atoms.

The aforesaid diisocyanate component can be any conventionally employed diisocyanate, for example, hexamethylene-1, 6-diisocyanate (Desmodur H); tolylene-2, 4-diisocyanate (Desmodur T 2,4); naphthalene-1,5-diisocyanate (Desmodur 15); or diphenylmethane-4,4'-diisocyanate (Desmodur 44). Tolylene diisocyanate is particularly suitable for this purpose.

Accordingly, the present invention relates to a packaging foil wherein the primer is a mixture of a. a polymer of a compound of the general formula

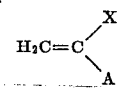

in which X represents chlorine or fluorine and A represents hydrogen or has the same meaning as X, b. a compound selected from the group consisting of an isocyanate of the formula:

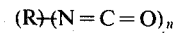

wherein R represents hydrocarbyl having from one to 18 carbon atoms; cyclohydrocarbyl having from five to 12 carbon atoms; single, multiple and fused ring aryl radicals having from six to 20 carbon atoms; Y — Z — Y wherein Z represents hydrocarbyl having from one to three carbon atoms and Y represents single, multiple and fused aryl and cyclohydrocarbyl radicals having from five to 20 carbon atoms; and n is an integer of at least 2 which corresponds to the valence of R; and a polyurethane of the formula:

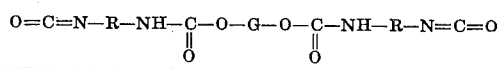

wherein R is as above and G is a long chain polymeric radical free from substituents reactive with an isocyanate and having a molecular weight above 480, and c. a reaction product having terminal hydroxyl groups and derived from a linear polyester with terminal hydroxyl groups and an organic diisocyanate, component (c) being present in such a quantity that there are no more than 60 parts by weight of component (c) to 40 parts by weight of component (a).

Illustrative of compounds of the formulae for organic compound (b) are: Hexamethylene-1, 6-diisocyanate, (Desmodur H), Toluene-2,4-diisocyanate, (Desmodur T 2,4; Mondur TDS; Nacconate 100)

Naphthalene-1,5-diisocyanate, (Desmodur 15; Multrathane N 5) Diphenylmethane-4,4'-diisocyanate, (Multrathane M; Desmodur 44;

Nacconate 300)

Triphenylmethane-4,4', 4''-triisocyanate, (Desmodur R; Mondur TM) and Polyurethane, formed by reaction of a OH—group containing polyester with a mixture of toluene-2,4-diisocyanate and toluene-2, 6-diisocyanate, (Desmophen VL 100).

Component (c) must contain terminal hydroxyl groups. In its preparation, therefore, the linear polyesters and diisocyanates must be reacted in substantially equivalent quantities, except that the linear polyester with terminal hydroxyl groups is used in a slight excess, so that the end product contains terminal hydroxyl groups. Component (c) advantageously has a molecular weight of from 50,000 to 150,000 and preferably around 100,000.

As top layer with a vinyl polymer base, it is likewise advantageous to use a polymer of a compound of the general formula

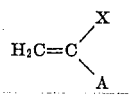

in which X and A have the meanings given above. Polymers which are preferred are those of compounds of the above formula in which X represents chlorine and A represents chlorine or hydrogen. This also applies in respect of the component (a) of the primer.

Such polymers are the aforementioned PVDC or the PVC. Dispersions or solutions of these polymers are conventional commercial products which are produced on a large industrial scale and are known, for example, under Trade Marks such as Saran (Dow Chemical Co.), Diofan (Badische Anilin and Soda-Fabrik, Ludwigshafen), and Ixan (Solvay, Brussels). Some of these products are not pure homo-polymers, but the polymers contain other monomers which can be copolymerised with the compounds of the above formula and which are incorporated by polymerisation. In accordance with the present invention, by polymers of the general formula

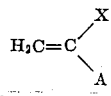

there are also to be understood those polymers which, in accordance with the prior art, contain minor quantities of comonomers. The quantity of these comonomers can be up to 25 percent of the total weight. Examples of suitable comonomers include acrylates, acrylonitriles, methacrylates, methacrylonitriles, vinyl chloride, styrene, maleates, vinyl esters, allyl crotonates, butadiene and epoxy compounds.

Such copolymers can likewise be used as component (a) of the primer of the packaging foil according to the invention. The comonomer is preferably so selected that copolymers are obtained which have an improved solubility with respect to PVDC. A technical disadvantage of pure PVDC is that it is comparatively sparingly soluble in easily accessible solvents. The use is thus facilitated by using, in the foregoing sense, copolymers which show an improved solubility in conventional solvents, such as ethyl acetate, methyl ethyl ketone, acetone or mixtures of these solvents. The reason for this is that the primer is applied in the form of a solution to the flexible support foil which is to be coated.

The component (a) of the primer of the packaging foil according to the invention contains the copolymerised monomeric compounds, advantageously in a quantity of 1 to 50 percent by weight based on the total weight of the component (a). Especially preferred are those polymers in which the copolymerised compounds are present in a quantity of 10 to 30 percent by weight, based on the total weight of the component (a). Such polymers show a good solubility in the aforementioned solvents and as a consequence can be handled particularly easily technically.

The degree of polymerisation of the compounds of general formula I, i.e., the molecular weight of these polymers, has the usual values, i.e., it is possible to use polymers with molecular weights such as those which are normal for the production of packaging foils of the aforementioned known type with a top layer having a PVDC and/or PVC base.

The conventional commercial isocyanate compounds can be used as component (b) according to the present invention, i.e., as organic compounds with at least two isocyanate groups. Diisocyanates are particularly preferred, more especially because these are easily available and are cheap. Triisocyanates or polyisocyanates with more than three isocyanate groups can, for example, also be used.

As already stated above, the component (b) is present in such quantities that the $-N = C = O$ content of the mixture, related to the solid content of the primer mixture, amounts to at least 0.1 percent by weight. In this sense, the isocyanate content of a primer mixture containing 98.26 g. of component (a) and 1.74 g. of toluylene diisocyanate amounts to 0.84 percent by weight, since the molecular weight of toluylene diisocyanate is 174 and the weight of the two isocyanate groups in the toluylene diisocyanate is 84. 1.74 g. of toluylene diisocyanate thus contains, in accordance with this definiation, 0.84 g. of isocyanate groups.

A remarkable effect on the bond strength between the support foil and the top layer is already obtained with the previously indicated lower limit of at least 0.1 by weight of isocyanate groups. A best possible bonding strength, also under tropical storage conditions, is obtained if the content of isocyanate groups, based on the solids, amounts to 2 to 7 percent by weight. With a higher proportion, the effect is generally progressively weaker. Proportions of isocyanate greater than 10 percent by weight are generally unsuitable. The best possible quantity by weight naturally depends on the type, i.e., more especially upon the molecular weight and the number of isocyanate groups in the polyisocyanate, and also on the type of the component (a).

According to the present invention, component (c) can be used in a quantity of at most 60 parts by weight to 40 parts by weight of component (a). In general, an appreciably better effect is obtained when the quantity of component (c) is from 20 to 50 parts by weight to 80 to 50 parts by weight of component (a). Particularly good results are obtained with a ratio of around 40 parts by weight of component (c) to around 60 parts by weight of component (a).

It is advisable to adapt the quantity of component (b) to the particular quantity in which component c) is added. The quantity of component (b) should then be measured in such a way that the $-N = C = O$ content of the mixture, based on the total weight of the solids content, i.e., component (a)+(b)+(c), is at least 0.5 percent by weight and more preferably from 1 to 5 percent by weight, and most preferably from 2 to 3 percent by weight.

Naturally, the mixture of component (a) and component (b) cannot be stored, but has a limited pot-life. As a rule, it has a pot life of from 2 to 50 hours, depending upon a variety of factors, especially the concentration, the water content of the solvent, and atmospheric humidity. The presence of moisture accelerates the reaction between components (a) and (b) naturally, the reactivity of the individual reaction components also affects pot-life. Accordingly, to prepare the packaging film according to the invention, reaction components (a) and (b) are mixed together at some suitable time before they are used. Accordingly, the primers or reaction components are separately delivered to the manufacturers of the packaging film. Components (a) and (b) can be stored for long periods before mixing.

If in accordance with a preferred embodiment of the invention, the adhesion promoter also contains component (c), this component can be mixed with component (a) some time before use, because the mixture of component (c) and component (a) is storable. The manufacturer of the packaging film then adds component (b) at some stage before use corresponding to the pot-life of the mixture.

The invention also provides a process for producing the packaging film according to the invention, wherein a solution or dispersion of a primer is applied to a flexible support layer, the solvent or dispersion medium of the primer is evaporated, and a solution or dispersion of a vinyl or vinylidene polymer is applied thereto as top layer and the solvent or dispersion medium of this top layer is evaporated, wherein the primer is a mixture of the aforesaid components (a), (b), and (c), component (c) being present in such a quantity that there are no more than 60 parts by weight of component (c) to 40 parts by weight of component (a).

EXAMPLE 1

An unstretched polypropylene film having a thickness of around 50 μ is exposed to a corona discharge to make its surface especially tacky and then coated with a primer solution of the following composition:

54 parts by weight of vinylidene chloride/acrylonitrile copolymer (Ixan WN, a product of SOLVAY, Brussels)
10 parts by weight of diphenylmethane diisocyanate (isocyanate content around 33 percent by weight)
36 parts by weight of a polyurethane readily soluble in ethyl acetate (Desmocoll 400, a product of Farbenfabriken Bayer, Leverkusen, Germany)
750 parts by weight of methyl ethyl ketone (solvent)

The solution is applied in such a quantity that, following evaporation of the solvent, a quantity of 0.3 g. of solids per sq. meter has been applied. The solvent is best evaporated at a temperature of around 40° C. with air being blown into a drying tunnel. A polyvinylidene chloride dispersion is then applied to the polypropylene film thus coated, and dried by intra-red radiation with vigorous circulation of air. The quantity applied amounts to around 5 g. of solids per sq. meter of film. The dispersion used is one marketed commercially as Diofan 190 D by Badische Anilin und Soda Fabrik (BASF), Ludwigshafen, Germany. The aqueous dispersion has a solids content of around 55 percent by weight. The film obtained shows outstanding permeability to water vapour and gases. After storage for 6 days at 40° C./90 percent relative humidity, there are no signs of any deterioration in adhesion.

EXAMPLE 2

A polyamide film with a weight per unit area of 50 g. per sq. meter is coated with a primer of the following composition:

56 parts by weight of the vinylidene chloride/acrylonitrile copolymer used in Example 1
6 parts by weight of tolylene diisocyanate (isocyanate content approximately 48 percent by weight)
38 parts by weight of a polyurethane readily soluble in ethyl acetate (Desmocoll 405, a product of Farbenfabriken Bayer, Leverkusen), and
750 parts of methyl ethyl ketone (solvent).

The primary layer dried following evaporation of the solvent as in Example 1 weighs about 1 g. per sq. meter. A polyvinylidene chloride dispersion, for example Ixan WA 91, is then applied to the film surface thus treated, followed by drying as in Example 1. The dispersion is applied in a layer thickness of 3 μ.

EXAMPLE 3

Samples of a biaxially stretched polypropylene film having a thickness of 20 μ are pretreated in known manner by a corona discharge and then coated with the primers described in Examples 1 and 2. The quantity in which the primers are applied is such that, following complete evaporation of the solvent, a quantity of around 0.5 g. per sq. meter is applied. The solvent is evaporated and a polyvinylidene chloride dispersion is subsequently applied as described in Example 1.

As support foil for use in accordance with the present invention, it is possible to use foils of those materials which are also already in common use for the known packaging foils of the type hereinbefore mentioned. Especially preferred are foils of polypropylene polyvinyl chloride, cellulose hydrate and polyesters, advantageously polyethylene terephthalate. In accordance with the present invention, however, foils with a base of other synthetic plastics materials, and also paper foils or metal foils, can also be used as support foils. The support foils can consist of a single web or of several foils which are stuck to one another.

We claim:

1. In a packaging foil comprising a flexible support member, a top layer of vinylpolymer wherein the vinyl polymer is a compound of the formula

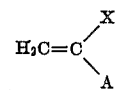

wherein X represents chlorine or fluorine and A represents hydrogen or X, and an adhesion promoter disposed therebetween, the improvement comprising an adhesion promoter which is a mixture of a. a polymer of a compound of the general formula

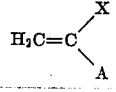

in which X represents chlorine or fluorine and A represents hydrogen or X, b. an organic composition of matter bearing at least 2 isocyanate moieties, —N = C = O, with the solids content of said —N=C=O moieties being at least 0.17 percent by weight based upon the total weight of the mixture, and c. a reaction product having terminal hydroxyl groups and derived from a linear polyester with terminal hydroxyl groups and an organic diisocyanate, component (c) being present in such a quantity that there are no more than 60 parts by weight of component (c) to 40 parts by weight of component (a).

2. A packaging foil as claimed in claim 1 wherein component (c) has a molecular weight of from 50,000 to 150,000.

3. A packaging foil as claimed in claim 1 wherein the quantity of component (c) is from 20 to 50 parts by weight, to from 80 to 50 parts by weight of component (a).

4. A packaging foil as claimed in claim 1 wherein the —N = C = O content of the primer mixture is at least 0.5 percent by weight, based on total solids content (a)+(b)+(c).

5. A packaging foil as claimed in claim 4 wherein the —N = C = O content is from 1 to 5 percent by weight.

6. A packaging foil as claimed in claim 5 wherein the —N = C = O content is from 2 to 3 percent by weight.

7. A packaging foil as claimed in claim 1 wherein the linear polyester is derived from an aliphatic dicarboxylic acid with up to 10 carbon atoms.

8. A packaging foil as claimed in claim 1 wherein the linear polyester is derived from an aliphatic diol with from two to six carbon atoms.

9. A packaging foil as claimed in claim 1 wherein the diisocyanate is selected from the group consisting of hexamethylene-1, 6-diisocyanate; tolylene-2, 4-diisocyanate; naphthalene-1, 5-diisocyanate; and diphenyl-methane-4,4'-diisocyanate.

10. The packaging foil as defined by claim 1, wherein the vinyl polymer of the top layer is a polymer selected from the group consisting of polyvinylidene chloride and polyvinyl chloride.

11. The packaging foil as defined by claim 1, wherein the top layer is comprised of a copolymer of a compound of the formula:

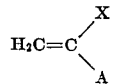

wherein X represents chlorine or fluorine and A represents hydrogen or X, and a comonomer copolymerizable therewith.

12. The packaging foil as defined by claim 1, wherein the polymer of component (a) is selected from the group consisting of polyvinylidene chloride and polyvinyl chloride.

13. The packaging foil as defined by claim 1, wherein the polymer of component (a) is a copolymer of a compound of the formula:

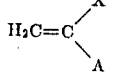

wherein X represents chlorine or fluorine and A represents hydrogen or X, and a comonomer copolymerizable therewith.

14. The packaging foil as defined by claim 13, wherein the copolymer is comprised of from between 1 and 50 percent by weight of the copolymerizable comonomer.

15. The packaging foil as defined by claim 14, wherein the copolymerizable comonomer. is an acrylate, a methacrylate, acrylonitrile, methacrylonitrile, styrene, a maleate, allyl crotonate, a vinyl ester, butadiene, vinyl chloride an epoxide or mixtures thereof.

16. The packaging foil as defined by claim 1, wherein the flexible support member is polypropylene, polyethylene, a polyester, a polyamide, polyvinyl chloride, paper, metal or cellulose hydrate.

17. The packaging foil as defined by claim 1, wherein the vinyl polymer of the top layer and adhesion promoter is polyvinylidene chloride.

18. A process for the production of a packaging foil which comprises applying a solution or dispersion of a primer to a flexible support member, evaporating the solvent or dispersion medium of the primer, applying a solution or dispersion of a vinyl or vinylidene polymer thereto as top layer and evaporating the solvent or dispersion medium of this top layer, wherein the primer is a mixture of a. a polymer of a compound of the general formula

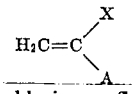

in which X represents chlorine or fluorine and A represents hydrogen or has the same meaning as X, b. an organic compound with at least 2 isocyanate, $-N=C=O$, groups. the $-N=C=O$ content, based on solids content (a)+(b), being at least 0.1 percent by weight, which mixture additionally contains c. a reaction product having terminal hydroxyl groups and derived from a linear polyester with terminal hydroxyl groups and an organic diisocyanate, component (c) being present in such a quantity that there are not more than 60 parts by weight of component (c) to 40 parts by weight of component (a).

* * * * *